United States Patent
Kitson

(10) Patent No.: US 6,956,501 B2
(45) Date of Patent: Oct. 18, 2005

(54) WIRELESS LINK FOR CAR DIAGNOSTICS

(75) Inventor: Fredrick L Kitson, Livermore, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 10/170,918

(22) Filed: Jun. 12, 2002

(65) Prior Publication Data

US 2003/0231118 A1 Dec. 18, 2003

(51) Int. Cl.[7] .......................... G08C 19/22; H04Q 9/00
(52) U.S. Cl. .......................... 340/870.07; 340/539.24; 701/33; 702/183
(58) Field of Search .................. 340/870.07, 539.22, 340/539.24, 539.25; 701/29, 33, 30; 702/127, 702/182, 183

(56) References Cited

U.S. PATENT DOCUMENTS

| | | | |
|---|---|---|---|
| 5,557,268 A | * | 9/1996 | Hughes et al. ............... 340/933 |
| 6,295,492 B1 | * | 9/2001 | Lang et al. .................... 701/33 |
| 6,330,499 B1 | * | 12/2001 | Chou et al. .................... 701/33 |
| 6,636,790 B1 | * | 10/2003 | Lightner et al. ............... 701/33 |
| 6,732,032 B1 | * | 5/2004 | Lowrey et al. ................ 701/33 |
| 6,745,151 B2 | * | 6/2004 | Marko et al. ................ 702/182 |
| 6,754,183 B1 | * | 6/2004 | Razavi et al. ............... 370/254 |
| 6,775,602 B2 | * | 8/2004 | Gordon et al. ................. 701/33 |

FOREIGN PATENT DOCUMENTS

EP 1001385 A2 * 5/2000 ............ G07C 5/00

* cited by examiner

*Primary Examiner*—Timothy Edwards, Jr.

(57) ABSTRACT

An improved monitoring system for use with motor vehicles having a plurality of sensors for measuring the performance of the vehicle and a memory for storing information specifying data derived from the sensors. The invention includes a wireless communication link for transmitting the information to a terminal that is proximate to the vehicle. The terminal communicates information processed by the terminal to the operator of the vehicle. The present invention can be implemented by installing a connector into the standard scanner port on the vehicle. The connector includes a wireless link that emulates a connection to a conventional vehicle scanner by generating control signals on the appropriate conductors on the scanner port.

27 Claims, 1 Drawing Sheet

WIRELESS LINK FOR CAR DIAGNOSTICS

FIELD OF THE INVENTION

The present invention relates to vehicle maintenance, and more particularly, to a wireless communication link.

BACKGROUND OF THE INVENTION

Modern vehicles continue to evolve to more complex machines requiring more complex technology to diagnose problems within the vehicle. Modern vehicles are run by onboard computers that receive signals from a large array of sensors and provide signals to an array of actuators that control the functioning of the vehicle. A failure in the sensors, actuators, the onboard computer or the connections between the various components can lead to a vehicle malfunction.

Many vehicle malfunctions may not be evident to the driver, since they affect only the smog control devices, the efficiency of the engine, or long term maintenance items. Even when the driver is aware of a problem with the vehicle, the driver often cannot determine the severity of the problem. For example, when an oil problem is detected and displayed by illuminating a light on the vehicle console, the driver cannot determine if the vehicle is out of oil or the oil sensor has failed. In older vehicles, the driver could at least check the "dip stick" to determine if there was oil in the oil reservoir in the engine. However, some newer cars have even done away with this mechanical aid.

Many problems can only be diagnosed by connecting a scanner to the vehicle through a wiring harness. While all scanners have certain generic functions, the most useful information requires a scanner that is individualized to the particular manufacturer. Even if an individual had a scanner for her vehicle, the expertise and cost needed to connect and utilize the scanner is beyond the capability of the vast majority of vehicle operators.

The problems inherent in detecting and diagnosing potential vehicle failures are further complicated by the rise of self-service gas stations. When gasoline was dispensed by an attendant, the attendant at least checked some of the fluid levels and tire inflation. Today, this function is left to the driver who seldom checks such items when he or she is filling the vehicle's fuel tank. Other problems include the need to become informed of current manufacture's recalls or warranty issues and to create a maintenance history for a car to improve the potential future diagnostic capabilities.

SUMMARY OF THE INVENTION

The present invention is an improved monitoring system for use with motor vehicles having a plurality of sensors for measuring the performance of the vehicle and a memory for storing information specifying data derived from the sensors. The invention includes a wireless communication link for transmitting the information to a terminal. The monitoring system of the present invention also includes a receiver for receiving a signal that causes the wireless communication link to transmit the information to the terminal thereby triggering the reporting of the stored information.

DETAILED DESCRIPTION OF THE PREFERRED EMBODIMENTS OF THE INVENTION

Figure 1:
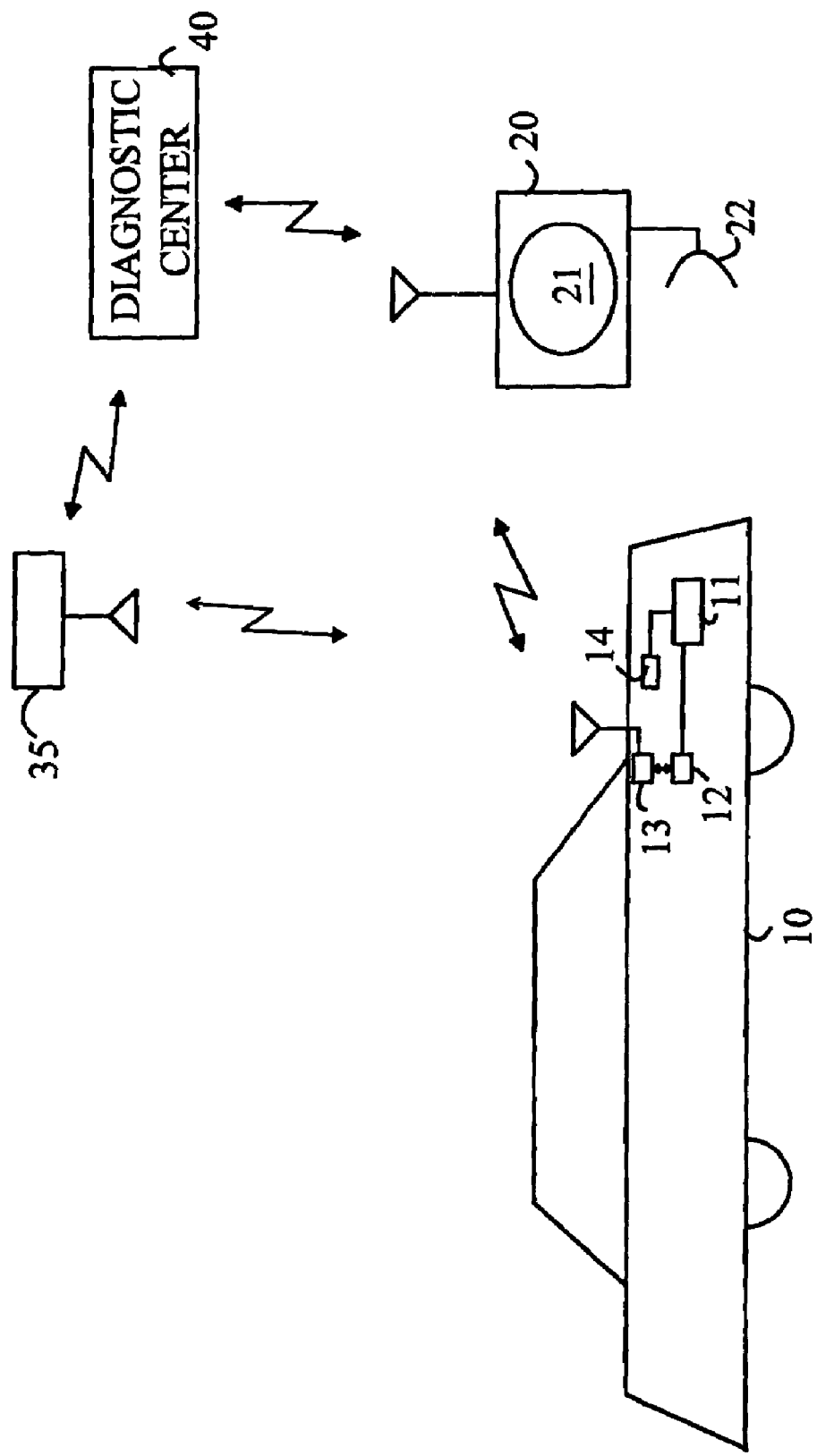
FIG. 1 illustrates a vehicle 10 having a diagnostic link according to the present invention.

The manner in which the present invention provides its advantages can be more easily understood with reference to FIG. 1, which illustrates a vehicle 10 having a diagnostic link according to the present invention. Vehicle 10 includes an onboard computer 11 that monitors various vehicle functions via one or more sensors 14, in addition to providing the signals that operate the engine and other functions in the vehicle. Computer 11 typically provides a number of signals and access to information stored in the memory of computer 11 on a connector 12. This information is accessed by connecting a scanner to connector 12 in conventional vehicles.

In a vehicle according to one preferred embodiment of the present invention, computer 11 is also coupled to a wireless link 13, which is utilized to transmit the data normally presented on connector 12 to a diagnostic station 20. The information is preferably sent in response to a query signal communicated by diagnostic station 20 to computer 11 in a manner similar to that utilized by a scanner to illicit the diagnostic information from computer 11 via connector 12.

Diagnostic stations such as diagnostic station 20 are preferably located in service stations at the fuel pumps. When the driver pulls into the station to purchase gas, the diagnostic station sends out the query signal to computer 11. The information obtained from computer 11 is then analyzed by a processor in diagnostic station 20 and the results are displayed on a screen 21 that is part of the diagnostic station. If the vehicle is operating within its normal operating range, diagnostic station 20 so informs the driver. If the vehicle's computer had previously stored an error code indicating a vehicle malfunction, the stored error, together with an explanation of the code is displayed. Diagnostic station 20 may also include an audio signal generator 22 for generating an acoustical message that can be heard by the driver.

Wireless links to computer 11 are known to the art. These links are typically utilized to control certain functions via signals sent from a satellite or a local base station as shown at 35. For example, some vehicles include a wireless link that allows an operator at a remote location to activate certain vehicle functions such as unlocking the car doors when the owner has locked his or her keys in the vehicle. Similarly, these systems detect certain events and communicate the events to the remote operator who takes appropriate action such as contacting the vehicle owner or sending emergency assistance. The triggering of the car alarm or the deployment of the air bags in the vehicle are examples of such events.

In vehicles that have such links, the present invention can be introduced by software alterations to computer 11 that cause computer 11 to output the diagnostic information in response to a query received via the satellite link. The information can be received at a remote site via the satellite link and then relayed to the diagnostic station screen or the diagnostic station can be equipped with a receiver that operates on the satellite frequency. This embodiment of the present invention also provides a means for introducing more advanced diagnostic analysis. The data transmitted from computer 11 can be forwarded to a diagnostic center 40 having much more complex computer hardware and software than that available with the computer that would normally be included in diagnostic station 20, which is limited by cost considerations. The results of the analysis would then be forwarded to diagnostic station 20 for display to the driver.

Portable versions of diagnostic station 20 can provide additional advantages. For example, such a portable station could be carried by tow trucks to quickly diagnose the problem associated with a stranded vehicle. Since a single interface works for all vehicles, the driver does not need to have a variety of different scanners to enable the device to work for the various possible makes of vehicles. In addition, the software in the portable station can provide a more sophisticated analysis of the vehicle problem; hence, tow truck operators having lower degrees of diagnostic skills can be utilized to provide roadside service.

The present invention may be implemented by providing an interface that connects directly to connector 12 or that connects directly to computer 11 bypassing connector 12. In embodiments in which the present invention connects directly to connector 12, the wireless link detects the signals on each of the lines in connector 12, or generates a signal on a specific line, to simulate a connection to a conventional scanner. In this regard, it should be noted that standardized connectors have been adopted for most vehicles, so that the number of conductors and function of each conductor in connector 12 does not vary across most of the vehicles manufactured in the past several years.

In one embodiment of the present invention, the wireless link of the present invention is implemented by inserting a plug into connector 12. The plug includes the circuitry necessary for simulating a connection to a scanner as well as the wireless transmission circuitry. Hence, the present invention can be introduced as a retrofit into existing vehicles.

The wireless link utilized in the present invention can be formed with a number of technologies. In the preferred embodiment of the present invention, an RF signal is modulated to provide the link. However, communication links based on optical wavelengths, particularly infrared links, and links based on acoustical signals may also be utilized. If the diagnostic station is set in an environment in which multiple vehicles may attempt to communicate simultaneously, each vehicle preferably utilizes a different communication channel. The channels can be formed using conventional coding techniques. Techniques such as encryption or communication standards such as 802.11 or Bluetooth are well understood and available in conjunction with standard Internet protocols used over Ethernet.

The wireless communication protocol used to transmit data to the diagnostic station can utilize any format. However, embodiments in which the wireless link emulates a processor executing an Ethernet protocol are particularly useful. In this case, the diagnostic station can be implemented on any standard computer that is equipped to communicate on Ethernet. Since wireless Ethernet adapters are widely available, such systems require significantly less custom hardware and software.

Various modifications to the present invention will become apparent to those skilled in the art from the foregoing description and accompanying drawings. Accordingly, the present invention is to be limited solely by the scope of the following claims.

What is claimed is:

1. In a monitoring system included in a motor vehicle having a plurality of sensors for measuring the performance of said vehicle and a memory for storing information specifying data derived from said sensors, the improvement comprising:

a wireless communication link for transmitting said information to a terminal; and a receiver for receiving a signal that causes said wireless communication link to transmit said information to said terminal, the signal being transmitted wirelessly to said receiver and results of processing the information being displayed at a fuel pump of a service station.

2. The vehicle monitoring system of claim 1 wherein said terminal comprises a display screen that is viewable from a location proximate to said vehicle.

3. The vehicle monitoring system of claim 1 wherein said terminal comprises an audio signal generator for generating an acoustical message that can be heard at a location proximate to said vehicle.

4. The vehicle monitoring system of claim 1 wherein said wireless communication link comprises a wireless Ethernet network link and wherein said terminal comprises a processor connected to said network.

5. The vehicle monitoring system of claim 1 wherein said wireless communication link transmits information to an intermediate processing station via a communication channel.

6. The vehicle monitoring system of claim 1 wherein said communication channel comprises a satellite communication link.

7. The vehicle monitoring system of claim 1 wherein a driver of the vehicle is informed if the information indicates a vehicle malfunction.

8. The vehicle monitoring system of claim 1 wherein a driver of the vehicle is informed of manufacture's recalls or warranty issues.

9. The vehicle monitoring system of claim 1 wherein the signal is transmitted wirelessly to said receiver when the vehicle pulls into the service station.

10. The vehicle monitoring system of claim 1 wherein said terminal is proximate to said vehicle.

11. The vehicle monitoring system of claim 10 wherein the terminal is located at the fuel pump of the service station.

12. A wireless communication link comprising:

a connector that mates to a vehicle connector for connecting a diagnostic station to said vehicle, said connector having a plurality of readout conductors, said vehicle providing diagnostic information on at least one of said readout conductors in response to a control signal on a control conductor contained in said vehicle connector; and a wireless link comprising a transmitter for transmitting signals present on said conductors and a receiver for generating said control signal in response to a wireless control signal received by said receiver, the wireless control signal being transmitted to said receiver and results of processing the information being displayed at a fuel pump of a service station.

13. The wireless communication link of claim 12 wherein said wireless link comprises an RF transmitter and receiver.

14. The wireless communication link of claim 12 wherein said wireless link comprises an optical transmitter and receiver.

15. The wireless communication link of claim 12 wherein said wireless link comprises an acoustical transmitter and receiver.

16. The wireless communication link of claim 12 wherein the diagnostic station is located at the fuel pump of the service station.

17. The wireless communication link of claim 12 wherein a driver of the vehicle is informed if the information indicates a vehicle malfunction.

18. The wireless communication link of claim 12 wherein a driver of the vehicle is informed of manufacture's recalls or warranty issues.

19. The wireless communication link of claim 12 wherein the wireless control signal is transmitted to said receiver when the vehicle pulls into the service station.

20. A method for monitoring a motor vehicle comprising
   providing a wireless communication link for transmitting information related to the performance of said vehicle to a terminal, said wireless communication link comprising a receiver for receiving a transmission signal;
   monitoring said receiver for said transmission signal; and
   transmitting said information on said wireless communication link in response to receiving said transmission signal; and
   displaying results of processing said information at a fuel pump of a service station.

21. The method of claim 20 wherein said terminal is proximate to said vehicle.

22. The method of claim 20 further comprising generating an acoustical message that can be heard at a location proximate to said vehicle.

23. The method of claim 20 wherein said wireless communication link comprises a wireless Ethernet network link and wherein said terminal comprises a processor connected to said network.

24. The method of claim 20 further comprising transmitting information to an intermediate processing station via a communication signal.

25. The method of claim 20 wherein the terminal is located at the fuel pump of the service station.

26. The method of claim 20 wherein a driver of the vehicle is informed if the information indicates a vehicle malfunction.

27. The method of claim 20 wherein a driver of the vehicle is informed of manufacture's recalls or warranty issues.

* * * * *